H. UNDERWOOD.
BELT FOR MACHINERY.
No. 27,846.  Patented Apr. 10, 1860.
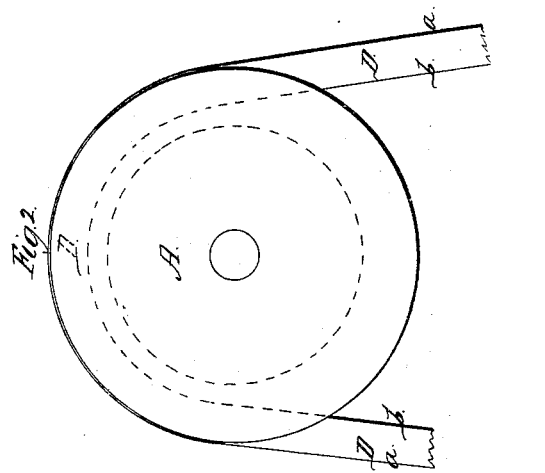
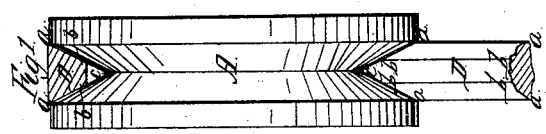
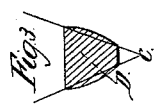
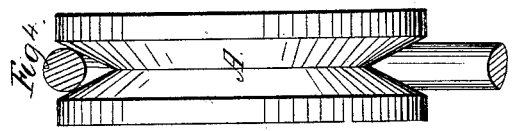
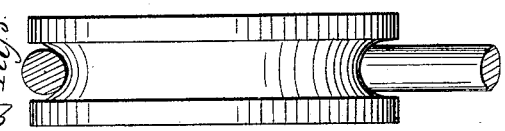
Witnesses
Wm Thompson
M. M. Livingston
Inventor
Henry Underwood

UNITED STATES PATENT OFFICE.

HENRY UNDERWOOD, OF NEW YORK, N. Y.

BELTING.

Specification of Letters Patent No. 27,846, dated April 10, 1860.

*To all whom it may concern:*

Be it known that I, HENRY UNDERWOOD of No. 210 Eldridge street, New York, county of New York, and State of New York, have invented a new and useful Improvement in Belting for Machinery; and I do hereby declare that the following is a full, clear, and exact description thereof, reference being had to the accompanying drawings, forming a part of this specification, in which—

Figure 1 represents an end view of a pulley with an angular groove showing my improved belt applied to the same, and represented in cross sections. Fig. 2 is a side view of Fig. 1. Fig. 3 is a modification of the belt of Figs. 1 and 2 with swelled bearing sides. Fig. 4, is an end view of the angular grooved pulley, with the ordinary round belt, and Fig. 5 shows a semi-circular grooved pulley, carrying a round belt.

Similar letters of reference indicate corresponding parts in the first three figures.

This invention is a novel belt to be used for driving all kinds of machinery, where it is necessary to use belting to transmit motion from one shaft to another. It is an improvement over the round, square or flat belting, in that it is not so liable to slip over the pulleys as the round belt and less material is required to form the belt, while it is equally as strong and durable as the round belt. As this improved belt is not so liable to slip on the pulleys, or to wind off the pulleys, machinery can be run with greater certainty and regularity than where belts of the present form are used.

My invention therefore consists in the employment of a belt, the section of which would be trapezoidal, or a shape nearly resembling this figure, in connection with an angular grooved pulley, whereby a much greater surface of the belt is brought in contact with the sides of the groove than with either the round or flat belt, and whereby the belt will wedge itself into the groove and resist a slipping action during the rotation of the pulleys, so that the greater the strain put upon one side of the pulley, the tighter will the belt be held in the grooves, as will be hereinafter described and represented.

To enable those skilled in the art to fully understand my invention, I will proceed to describe its construction and operation.

In the drawings A represents an ordinary angular grooved pulley, which is used at the present time with the round belt as shown by Fig. 4, but it will be seen by reference to Fig. 5 that in Fig. 4 there is much less bearing surface, or friction surface for the belt than in Fig. 5, still the angular pulley of Fig. 4, with the round belt is found preferable as the belt will wedge itself into the angular groove, and thus hold more securely than where a corresponding curved groove is employed; but it will be observed that there is a constant wear on the round belt, when used with the angular groove, and that by twisting this belt, it is liable to ride or run out of its groove. Still the friction of contact between the groove and belt is not sufficient to prevent it from slipping under all circumstances, therefore to obviate the evils attending belts of the present description, I have invented a belt of a peculiar form, which will present two thirds of its surface to that of the groove in which it runs, and a surface equal to a belt of twice the width of the round belt, taken through its diameter. This calculation is of course understood to be between belts of the same strength. My improved belt D would be, in cross section, the shape of an acute trapezoid with the lines *a, b,* corresponding to the inclined surfaces of the annular groove in the pulley. The triangle included by the lines *b, c, b,* must be cut out so that the belt will not, under any circumstances come in contact with the angle of the groove, for in this event the belt would cease to tighten itself in the groove and there would be less bearing or friction surface, than in the round belt, but by cutting off a triangular strip from the underside, or rather leaving it off in making the belt, a space will remain between the parallel surface *b, b*, and the angle of the groove, which will allow the belt to wedge itself tightly into the groove as represented by Fig. 1.

On account of the peculiar shape of this belt, it will have a great tendency to keep within the groove in the pulley, and unless the parallel surface $b$, $b$, is thrown entirely out of the groove, the belt will not be liable to run off the pulley, and it will not be as apt under any circumstances to run off as with belts of the present form with round or angular grooved pulleys.

In regard to the comparative cost of my belt, it will be seen that the material can be worked up to a better advantage there will be less waste and less time will be required in the manufacture, while the belts will be equally as strong and durable as the round belt.

Having thus described my invention, what I claim and desire to secure by Letters Patent, is—

The trapezoidal belt for machinery, as described and represented, forming a new article of manufacture.

HENRY UNDERWOOD.

Witnesses:
WM. THOMPSON,
M. M. LIVINGSTON.